US009638319B2

(12) United States Patent
de Visscher

(10) Patent No.: US 9,638,319 B2
(45) Date of Patent: May 2, 2017

(54) METHOD FOR CONTROLLING A DUAL CLUTCH TRANSMISSION OF A VEHICLE

(71) Applicant: TRANSMISIONES Y EQUIPOS MECÁNICOS, S.A. DE C.V., Queretaro (MX)

(72) Inventor: Nico de Visscher, Laarne (BE)

(73) Assignee: TRANSMISIONES Y EQUIPOS MECANICOS, S.A. DE C.V. (MX)

( * ) Notice: Subject to any disclaimer, the term of this patent is extended or adjusted under 35 U.S.C. 154(b) by 0 days.

(21) Appl. No.: 14/627,831

(22) Filed: Feb. 20, 2015

(65) Prior Publication Data

US 2015/0233474 A1   Aug. 20, 2015

(30) Foreign Application Priority Data

Feb. 20, 2014   (EP) .................................... 14156026

(51) Int. Cl.
*F16H 61/00*   (2006.01)
*F16H 61/688*   (2006.01)
*F16H 61/08*   (2006.01)
*F16H 61/04*   (2006.01)

(52) U.S. Cl.
CPC ....... *F16H 61/688* (2013.01); *F16H 61/0437* (2013.01); *F16H 61/08* (2013.01); *F16H 2312/08* (2013.01)

(58) Field of Classification Search
CPC ........... F16H 61/688; F16H 2061/0407; F16H 2061/0429
See application file for complete search history.

(56) References Cited

U.S. PATENT DOCUMENTS

| 4,517,859 A | 5/1985 | Nagaoka et al. ............... 74/866 |
| 2004/0112171 A1* | 6/2004 | Kuhstrebe ......... B60W 30/1819 74/730.1 |
| 2005/0282683 A1* | 12/2005 | Tanba .................. B60W 10/113 477/180 |
| 2006/0011004 A1* | 1/2006 | Sakai .................. F16H 57/0006 74/340 |
| 2006/0236798 A1* | 10/2006 | Krauss .................... F16D 48/08 74/325 |

(Continued)

FOREIGN PATENT DOCUMENTS

| DE | 100 15 296 | 8/2001 | ............. F16D 48/08 |
| DE | 100 48 239 | 10/2001 | ............. F16H 63/46 |

(Continued)

OTHER PUBLICATIONS

Extended European Search report issued in corresponding EPO patent application 14156026.8-1755 dated Aug. 6, 2014 (5 pgs).

*Primary Examiner* — Tisha Lewis
(74) *Attorney, Agent, or Firm* — Hayes Soloway P.C.

(57) ABSTRACT

Provided is a method for controlling a dual clutch transmission of a vehicle with a first clutch associated with a first set of gears and a second clutch associated with a second set of gears. The method includes the steps of a) engaging the first clutch to transmit the torque through one of the associated first set of gears, while the second clutch is not engaged, and b) thereafter engaging, before the first clutch is fully closed, the second clutch at least partially and releasing the first clutch assembly until the first clutch is completely disengaged.

12 Claims, 1 Drawing Sheet

(56) References Cited

U.S. PATENT DOCUMENTS

| | | | | |
|---|---|---|---|---|
| 2010/0048354 A1* | 2/2010 | Leibbrandt | ......... | F16H 61/0059 477/172 |
| 2012/0220423 A1* | 8/2012 | Goeppert | ................ | F16D 48/06 477/80 |
| 2014/0130625 A1* | 5/2014 | Dewitz | ..................... | F16H 3/08 74/335 |

FOREIGN PATENT DOCUMENTS

| | | | | |
|---|---|---|---|---|
| DE | 102 18 186 | 11/2003 | ............. | F16H 43/46 |
| EP | 1 382 479 | 1/2004 | ............. | B60K 41/22 |

* cited by examiner

METHOD FOR CONTROLLING A DUAL CLUTCH TRANSMISSION OF A VEHICLE

The invention relates to a method for controlling a dual clutch transmission of a vehicle.

BACKGROUND OF THE INVENTION

Dual clutch transmissions for vehicles are known. They are used in an attempt to combine the advantages of manual transmissions, namely the high degree of efficiency, with the advantages of automatic transmissions, namely the change between gears without interruption of the torque transmission. Although dual clutch transmissions provide better performance and higher comfort than a single clutch transmission, they still suffer from some drawbacks.

In known dual clutch transmissions, comfort has to be compromised for performance, especially when launching the vehicle from standstill. This is due to the fact that a powerful launch has to be carried out in the $1^{st}$ gear completely, followed by a potentially uncomfortable shift into the $2^{nd}$ gear. A comfortable launch however can be carried out in the $2^{nd}$ gear from the beginning; performance is then however a compromise.

It is thus the object of the invention to provide a method for controlling a dual clutch transmission that enables powerful launches without compromising the comfort.

BRIEF DESCRIPTION OF THE INVENTION

In order to solve this object, the invention provides a method for controlling a dual clutch transmission of a vehicle with a first clutch associated with a first set of gears and a second clutch associated with a second set of gears is provided. The method comprises the following steps:
 a) engaging the first clutch to transmit torque through the associated first set of gears, while the second clutch is not engaged,
 b) engaging, before the first clutch is fully closed, the second clutch at least partially.

Engaging the second clutch before the first clutch is fully closed results in a smooth transition between gears because a closed clutch and a gear shift from a closed clutch are potentially associated with oscillations that cause discomfort. Furthermore, flexibility in the choice of the gear at the second clutch is achieved as the second clutch is not engaged at the beginning of step a). Therefore, the gear at the second clutch can be chosen freely.

A "fully closed" clutch is considered a clutch that operates without slip, regardless of the actual torque capacity.

Preferably, the coupling process performed by the first clutch is the first coupling process for accelerating the vehicle from standstill, allowing a launch of the vehicle with the use of only one gear without compromising the comfort.

According to an embodiment of the invention the coupling process performed by the first clutch is the coupling process of connecting the $1^{st}$ gear with the engine, providing the transmission necessary for a powerful launch of the vehicle.

According to a further embodiment of the invention, the maneuver intended by the driver is detected, in particular by analyzing the position of the throttle pedal, the vehicle's speed and/or the angle of the steering wheel. This way, it is possible to anticipate if the driver desires a fast and powerful launch, a more comfortable launch or if the driver is actually performing a parking maneuver. Obviously, the different maneuvers do not have to be discrete and distinct to each other. Rather, the performance/level of comfort requested by the driver is assessed on a continuous scale so that every possible maneuver between the most powerful and the most comfortable launch can be detected.

Preferably, at the beginning of step a) the $1^{st}$ gear is selected at the first set of gears and the reverse gear is selected at the second set of gears, allowing a powerful launch without avoiding long shifting times in the case the driver intends to perform a parking maneuver.

In another embodiment the $2^{nd}$ gear is selected at the second set of gears before the beginning of step b) if the detected maneuver is a launch, enabling an early shift into the $2^{nd}$ gear to increase the comfort of the launch.

Preferably, the reverse gear remains selected at the second set of gears if the detected maneuver is a parking maneuver, in order to allow quick direction changes of the vehicle.

According to a further embodiment of the invention the instant at which step b) is initiated is chosen depending on the detected maneuver, allowing a launch that fits the desires of the driver regarding the performance and the comfort. Especially, if the detection of driving maneuvers uses a continuous scale, the instant for engaging the second clutch can be adjusted to fit the driver's requests perfectly.

In another embodiment of the invention the second clutch is engaged before the slip of the first clutch falls below a predetermined threshold, preferably before the slip ceases completely, avoiding the need to increase the engine's speed.

In a further embodiment of the invention the second clutch is at least partially engaged before the engine's speed increases over the speed necessary to set the vehicle in motion. This way the speed of the engine can be kept as low as possible increasing the driver's comfort because the sound emission and vibration of the engine are minimized.

According to a preferred embodiment of the invention after step b) and a change of gears at the first set of gears, the first clutch is at least partially engaged before the second clutch is fully closed. This way, subsequent gear shifts are possible allowing smooth transitions over multiple gears and long lasting launches.

Needless to say, step b) can be repeated with alternating engaged clutches in order to allow smooth transitions regardless of the length of the launch.

BRIEF DESCRIPTION OF THE DRAWINGS

Further features and advantages of the invention will be apparent from the following description of the embodiments and the attached drawings to which reference is made and in which.

DETAILED DESCRIPTION OF THE INVENTION

Figure 1:
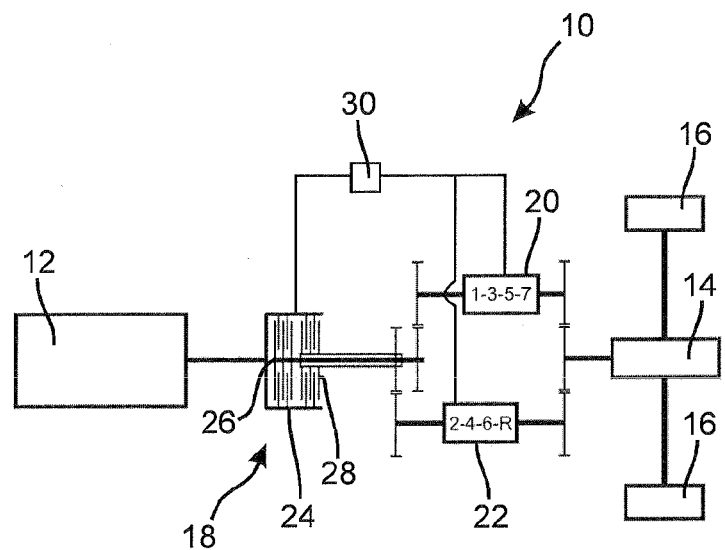
FIG. 1 shows a known dual clutch transmission schematically capable of carrying out the method according to the invention.

FIG. 1 shows schematically a dual clutch transmission adapted for transmitting a torque from an engine 12 to a differential 14 connected to two wheels 16 of a vehicle.

The dual clutch transmission 10 comprises a dual clutch 18 and two sets of gears 20, 22. The details of sets of gears are known and hence are neither drawn nor explained in great detail in the following.

Each of the sets of gears 20, 22 has an input—and an output shaft and several pairs of gear wheels that provide different transmission ratios, i.e. gears, between the input shaft and the output shaft of the respective set of gears.

In general, the pairs of gear wheels for the odd gears ($1^{st}$, $3^{rd}$, $5^{th}$ and $7^{th}$ gear) are arranged in the one set of gears 20, labeled the first set of gears 20 in the following. The pairs of gear wheels for the even gears ($2^{nd}$, $4^{th}$ and $6^{th}$ gear) and the reverse gear (R) are arranged in the other set of gears 22, the second set of gears 22 in the following.

The dual clutch 18 comprises a cage or housing 24 drivingly connected to a crank shaft of the engine 12, a set of first clutch plates 26 and a set of second clutch plates 28. For easy reference, the sets of clutch plates 26, 28 will in the following be referred to as "clutch".

The first clutch 26, if engaged, provides for torque transmission from engine 12 to the first set of gears 20. Likewise, the second clutch 28, if engaged, provides for torque transmission from engine 12 to the second set of gears 22.

Obviously, the labeling of the set of gears 20, 22 and clutches 26, 28 is arbitrary and can be changed without departing from the inventive idea.

The output shafts of the set of gears 20, 22 are drivingly connected to the differential 14.

The clutches 26, 28 can be engaged and released independently by a control unit 30, and the control unit 30 is capable of selecting the active gear, i.e. the pair of gear wheels that engage and transmit torque, of the sets of gears 20, 22.

Furthermore, the control unit 30 is capable of detecting the driving maneuver intended by the driver, in particular by analyzing the position of the throttle pedal (not shown), the vehicle speed and/or the angle of the steering wheel (not shown). For this purpose the control unit 30 can be connected to the motor control unit (not shown) or appropriate sensors (not shown).

It is possible that the control unit 30 itself is part of the engine control unit.

The method according to the invention is explained with reference to FIG. 2.

Figure 2:
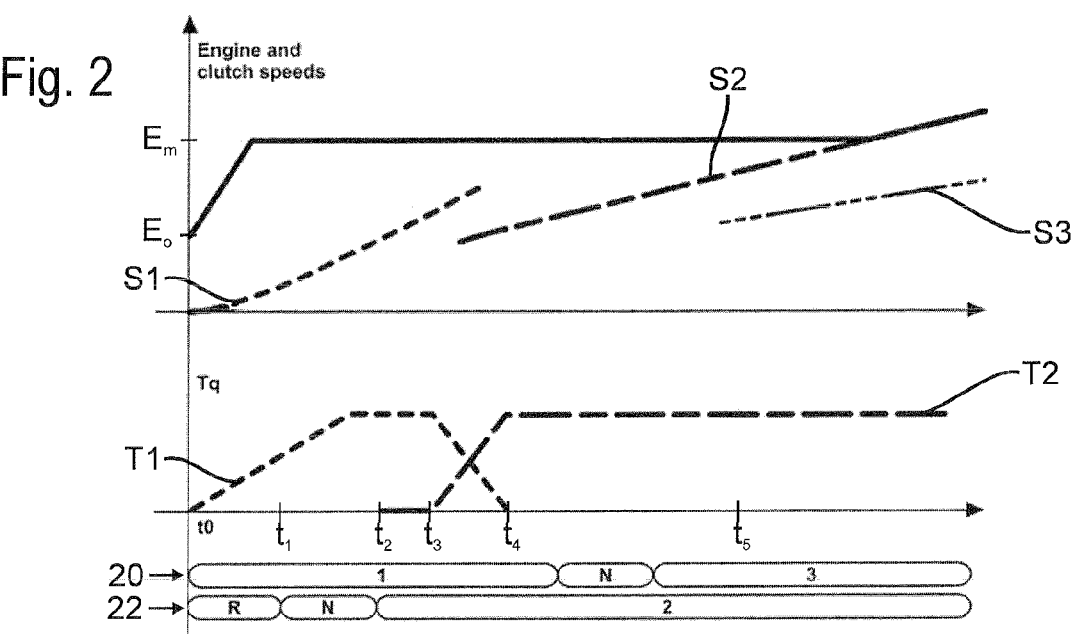
FIG. 2 shows a diagram of the torques transmitted by the clutches and the speeds of the clutches and that of the engine during the method according to the invention.

FIG. 2 shows two synchronous diagrams.

The upper diagram shows the engine's speed (solid line) and the speed of the clutches 26, 28 when drivingly connected to a gear. Line S1 shows the speed of the first clutch 26 if the $1^{st}$ gear is selected in the first set of gears 20 and line S2 shows the speed of the second clutch 28, if the $2^{nd}$ gear is selected at the second set of gears 22. Line S3 hints the speed of the first clutch 26, if the $3^{rd}$ gear were selected at the first set of gears 20 and the first clutch 26 engaged.

The lower diagram shows the torque applied to the clutches 26 and 28 (lines T1, T2, respectively). At the very bottom of the diagram, two lines indicate the gears selected at the respective set of gears 20, 22 are shown over the time.

The depicted situation corresponds to a vehicle start from standstill and is used to illustrate the method according to the invention.

Obviously, the method according to the invention can be used in situations other than a launch of the vehicle as well.

At the beginning ($t_0$), the vehicle is at standstill. The engine is running at its idle speed $E_0$, and both clutches 26 and 28 are disengaged. The $1^{st}$ gear is selected at the first set of gears 20, and the reverse gear R is selected at the second set of gears 22.

The launch is performed by engaging the first clutch 26. Accordingly, the speed of rotation of the first clutch 26 rises. At the same time the engine's speed rises as well so that the engine is capable of delivering the requested torque. The engine's speed increases to a minimum level $E_m$ necessary to launch the vehicle.

During the launch, the control unit 30 analyzes the driver's inputs and vehicle parameters like the position of the throttle pedal, the vehicle's speed and/or the angle of the steering wheel. On the basis of this information, the control unit 30 detects the driving maneuver intended by the driver and anticipates the necessary steps to fulfill this maneuver.

In the beginning of each launch, the driving maneuver could as well be a parking maneuver. In order to be able to react quickly to a desired direction change, the reverse gear remains selected at the second set of gears 22.

The fact that the reverse gear is selected at the second set of gears 22 comes with the benefit of a very fast direction change of the vehicle because in the case of a parking maneuver. Only clutch actions are required to accelerate the vehicle in either direction. This way, the time consuming selection of the reverse gear at the second set of gears 22 is already completed.

However, once the performed maneuver cannot be seen as the beginning of a parking maneuver anymore, e.g. after a short while of permanent acceleration, the control unit 30 prepares the dual clutch transmission 10 for a shift into the $2^{nd}$ gear by deselecting the reverse gear at the second set of gears 22 at the time $t_1$. Subsequently, the $2^{nd}$ gear is selected at the $2^{nd}$ set of gears 22.

Further, the second clutch 28 is prepared for torque transmission at time $t_2$. The plates of the second clutch 28 are brought close together to the so called "touch point" or "kiss point". In this position, the gap between the disks is removed and a transmission of torque can be initiated right away.

In the meantime, the first clutch 26 is closed further so that the clutch's speed increases as well.

At time $t_3$ the control unit 30 initiates the shift into the $2^{nd}$ gear. At this instant, the first clutch 26 is not fully closed, i.e. it does operate with slip. The slip of the clutches 26, 28 can be seen in FIG. 2 as the difference between the clutch's speed and the engine's speed.

The second clutch 28 is engaged at least partially and the first clutch 26 is released accordingly, until the first clutch 26 is completely disengaged at time $t_4$. The whole torque of the engine is then transmitted through the second clutch 28 and the second set of gears 22, i.e. the $2^{nd}$ gear.

The point in time $t_3$ at which the second clutch 28 is engaged can be chosen by the control unit 30 depending on the detected maneuver.

If the control unit 30 anticipates that the driver wants to perform a launch with little performance, the shift into the $2^{nd}$ gear is initiated earlier.

If, however, the driver requests a more powerful launch, the engagement of the second clutch is delayed.

For the cases in which the driver requests a very high performance, for example by requesting full throttle, the control unit 30 is able to delay the engagement of the second clutch 28 to a point in time after the first clutch 26 is already fully closed. This high performance launch would correspond to a traditional launch in the $1^{st}$ gear, followed by a separate known shift into the $2^{nd}$ gear.

However, in the most cases the second clutch 28 is engaged before the slip of the first clutch 26 falls below a predetermined threshold, preferably before the slip ceases completely.

The second clutch 28 is also at least partially engaged before the engine's speed increases over the speed $E_m$ necessary to set the vehicle in motion. In the most cases, this instant correlates with the complete closure of the clutch so that the increasing the engine's speed is the only way for further accelerating the vehicle.

After $t_4$, the launch is continued in the $2^{nd}$ gear, and the second clutch 28 is continuously closed.

The launch can be either completed in the $2^{nd}$ gear by fully closing the second clutch 28, as shown in FIG. 2, or it can be continued with another gear shift.

Another gear shift could be carried out at time $t_5$ as hinted by the line S3 for a hypothetical speed of the first clutch 26 when engaged in the $3^{rd}$ gear.

At this instant the control unit 30 has already arranged for a change of gears at the first set of gears 20 so that the $3^{rd}$ gear is selected at the first set of gears 20.

Similar to the situation at $t_3$, the second clutch 28 is not fully closed at $t_5$ so that a gear shift into the $3^{rd}$ gear would be of the same kind as the shift into the $2^{nd}$ gear. This way a very comfortable but long launch can be achieved.

By alternating the torque from one clutch 26, 28 to the other 28, 26 without fully closing any of the clutches 26, 28, even long lasting launch maneuvers can be carried out comfortably.

In short, with the method according to the invention, the advantages of a launch in the $1^{st}$ gear can be achieved without loosing the comfort of a launch in the $2^{nd}$ gear or the flexibility to perform a sudden change of direction.

The invention claimed is:

1. A method for controlling a dual clutch transmission of a vehicle with a first clutch associated with a first set of gears and a second clutch associated with a second set of gears, comprising the following steps:
   a) engaging said first clutch to transmit a torque through one of said associated first set of gears, while said second clutch is not engaged; and
   b) thereafter engaging, before said first clutch is fully closed, said second clutch at least partially and releasing the first clutch accordingly until the first clutch is completely disengaged.

2. The method of claim 1 wherein engaging said first clutch is a first coupling process performed for accelerating a vehicle from standstill.

3. The method of claim 1 wherein engaging said first clutch is a coupling process performed for connecting a $1^{st}$ gear with an engine.

4. The method of claim 1 wherein a maneuver intended by a driver is detected via analyzing a position of a throttle pedal, a vehicle speed and/or an angle of a steering wheel.

5. The method of claim 4 wherein, at the beginning of step a), a $1^{st}$ gear is selected at said first set of gears and a reverse gear is selected at said second set of gears.

6. The method of claim 4 wherein a $2^{nd}$ gear is selected at said second set of gears before beginning of step b) if said detected maneuver is a launch.

7. The method of claim 4 wherein a reverse gear remains selected at said second set of gears if said detected maneuver is a parking maneuver.

8. The method of claim 4 wherein a point in time ($t_3$) at which step b) is initiated is chosen depending on a detected maneuver.

9. The method of claim 1 wherein said second clutch is engaged before a slip of said first clutch falls below a predetermined threshold.

10. The method of claim 1 wherein said second clutch is at least partially engaged before said engine's speed increases over a speed necessary ($E_m$) to set said vehicle in motion.

11. The method of claim 1 wherein after step b) and a change of gears at said first set of gears, said first clutch is at least partially engaged before said second clutch is fully closed.

12. The method of claim 1 wherein said second clutch is engaged before a slip of said first clutch ceases completely.

* * * * *